United States Patent [19]

Kurz, Jr. et al.

[11] 3,918,799

[45] Nov. 11, 1975

[54] MIRROR CASE

[75] Inventors: Arthur W. Kurz, Jr., Birmingham; Harold R. Wilson, Holland, both of Mich.

[73] Assignee: Donnelly Mirrors, Inc., Holland, Mich.

[22] Filed: May 1, 1973

[21] Appl. No.: 356,074

[52] U.S. Cl. .............................. 350/288; 350/310
[51] Int. Cl. .......................................... G02b 5/08
[58] Field of Search .......... 350/288, 303, 304, 307, 350/310

[56] References Cited
UNITED STATES PATENTS

| 2,869,425 | 1/1959 | Kershaw | 350/303 |
| 2,910,915 | 11/1959 | Harris | 350/288 |
| 3,391,895 | 7/1968 | Bausch | 350/288 |
| 3,429,096 | 2/1969 | Dgkema | 350/288 |
| 3,448,553 | 6/1969 | Herr et al. | 350/288 |
| 3,628,851 | 12/1971 | Robertson | 350/303 |
| 3,776,618 | 12/1973 | Perison | 350/288 |

Primary Examiner—Alfred E. Smith
Assistant Examiner—Michael J. Tokar
Attorney, Agent, or Firm—Price, Heneveld, Huizenga & Cooper

[57] ABSTRACT

A lightweight rearview mirror assembly for vehicles and a method for forming the same. The assembly includes a case formed from a thermoplastic material and a mirror element mounted therein. A thin, upstanding edge of the case is heated and curled into an arcuate, peripheral, retaining edge extending over the entire length of the mirror edge. The curled, arcuate edge defines therewithin a space extending between the entire thickness of the peripheral edges of the mirror and the case which allows the mirror and case to expand or contract in extreme temperatures without expelling or breaking the mirror element. Means are provided for preventing the mirror from vibrating within the case.

21 Claims, 16 Drawing Figures

MIRROR CASE

This invention relates to mirror assemblies for vehicles and, more particularly, to a lightweight, molded mirror assembly which reduces vibration to a minimum and prevents the expelling or breaking of the mirror element in extreme temperatures.

BACKGROUND OF THE INVENTION

Mirror assemblies for use on vehicles are subjected to severe operating conditions including both prolonged vibration as well as extremes in temperatures in various climatic regions. Prior mirror assemblies have included mirror cases formed from metallic materials wherein the edges of the case are bent tightly around a glass mirror element retained therewithin. Such assemblies are quite heavy and therefore very difficult to support in the correct viewing position without large, bulky supporting structures secured to the vehicle. Further, since the glass mirror element often does not mate exactly with the metallic case, the mirror element is retained only loosely therewithin causing an irritating rattle under conditions and periods of vibration. Moreover, when the formed cases are fromed such that the glass element is held tightly and securely therewithin to prevent vibration, the significant differences in coefficients of expansion of the glass and metallic materials would cause the glass element to break due to expansion or contraction of either the element or the case itself in extreme temperatures.

Other attempts have been made to solve these problems by forming mirror cases out of plastic materials. One such prior assembly includes a solid plastic case with sides extending tightly against the mirror and then flat over against the front surface of the mirror. Such assemblies were also susceptible to vibration of the mirror element within the case and had the further drawback of either cracking the glass mirror element or allowing it to pop out of the surrounding case when the assembly was subjected to extremely high temperatures such as those encountered in tropical or semitropical regions. Moreover, the solid plastic case added significantly to the weight of the mirror element itself thereby requiring significant supporting structure for attachment to a particular vehicle.

A further problem with prior known mirror cases is the relatively low yield of acceptable assemblies obtained. In prior assemblies with the case adhered to or located tightly against the edge of the mirror element, any irregularity in the mirror element edge was visible. Such imperfect assemblies had to be rejected under applicable standards of quality. Especially with glass mirrors, where chipping or other minor imperfections often occur during production, the prior cases were such that these elements had to be rejected. Rejection rates for some mirror assemblies reached as high as 30 per cent of total production.

Therefore, prior mirror assemblies have suffered from one or more of these problems of vibration and inadequate retention of the mirror element within the case in extreme temperatures, undesirable weight in the mirror assembly as a whole, and/or unsatisfactory rejection rates for mirror assembly production.

SUMMARY OF THE INVENTION

Accordingly, it is the purpose of the present invention to provide a lightweight mirror assembly especially adapted for use in vehicles wherein a mirror element is securely retained within a molded, thermoplastic case and prevented from rattling and vibrating therewithin. Provision is made for allowing the expansion and contraction of the mirror element and case in extreme temperatures without expelling or breaking the mirror element. In the preferred embodiment, the case itself is extremely lightweight with the back of the mirror element supported a distance spaced from the molded back of the case thereby reducing the amount of material in the case to a minimum.

The invention also provides a method for forming an arcuate retaining edge about the entire periphery of the mirror element. The arcuate retaining edge is heated and curled over the peripheral edge of the mirror to retain the mirror against the supporting structure of the case while providing an integral space between the edge of the mirror and the side of the case allowing expansion and contraction of the mirror element and case to prevent the expelling of the mirror therefrom in extreme temperatures. The edge-forming method provides an efficient, economical method for forming the arcuate edge over the mirror element while significantly reducing the number of rejected assemblies since the case and method allow the utilization of otherwise imperfect mirror elements having chipped or irregular peripheral edges.

In the preferred embodiment, the mirror assembly comprises a molded, thermoplastic case having a back and an integral, continuous peripheral side outlining the peripheral edge of a mirror element received therewithin. The case includes integral, upstanding ribs for supporting the mirror element a distance spaced from the back of the case. The mirror element is sized to provide an integral space between its edge and a thin, upstanding peripheral side wall of the case. The side wall is curled over the adjacent edge of the mirror element in a semicircular fashion such that it contacts the front surface of the mirror substantially normally thereto. Accordingly, the mirror element may expand freely beneath the formed, arcuate edge into the integral space between its edge and the case sides. Rattling and vibrating are prevented by the pressure of the formed edge pressing the mirror downwardly against the upstanding ribs. In one form of the invention, a polyvinyl chloride (P.V.C.) platisol layer may be applied to and cured by heating on the back of the mirror element with the upstanding ribs being impressed thereinto to further prevent rattling and vibration of the mirror element while allowing expansion thereof.

The basic method for forming the mirror assembly described above includes providing a molded thermoplastic case of the type described, loading the mirror element into the case, and heating the upstanding thin edge of the case by forcing heated fluid thereagainst. Following the heating of the edge, the edge is brought into contact with a Teflon-coated, forming die which curls the edge into the hollow arcuate configuration described above. The forming die is left in contact with the curled edge for a period of time until sufficient cooling has occured to allow the curled edge to remain in contact with the mirror element.

These and other objects, advantages, purposes and features of the invention will become apparent from a study from the following description taken in conjunction with the drawings.

DESCRIPTION OF THE PREFERRED EMBODIMENT

Figure 1:
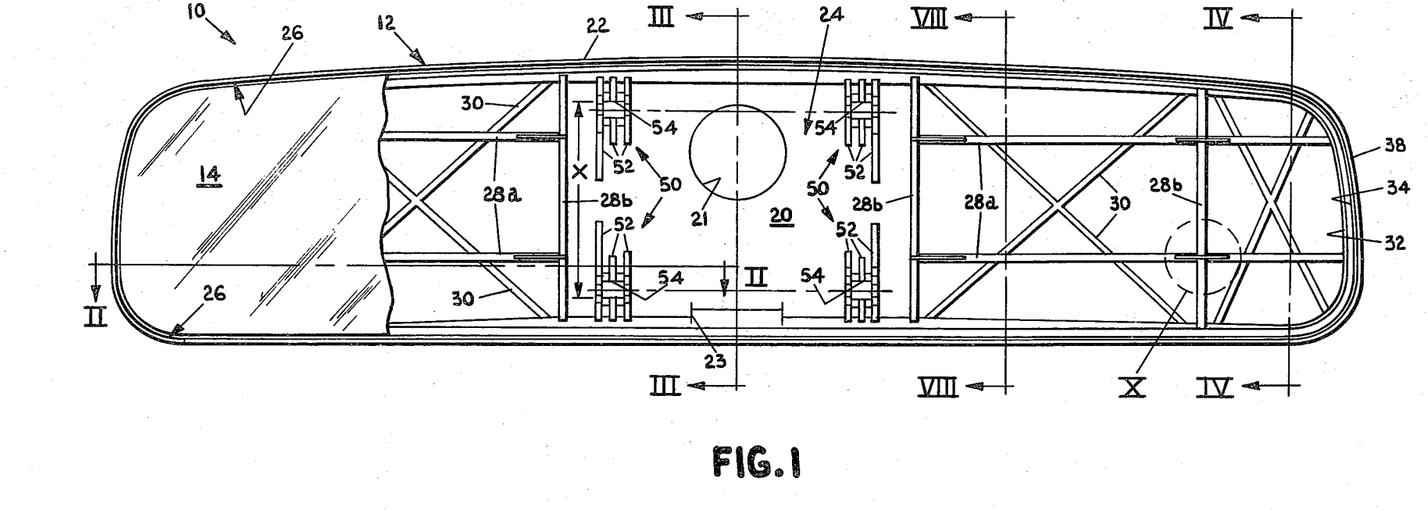
FIG. 1 is a front elevation of the rearview mirror case including a mirror element received therein and showing the extending edges of the case prior to their formation over the mirror element in accordance with the method described below.
Figure 2:
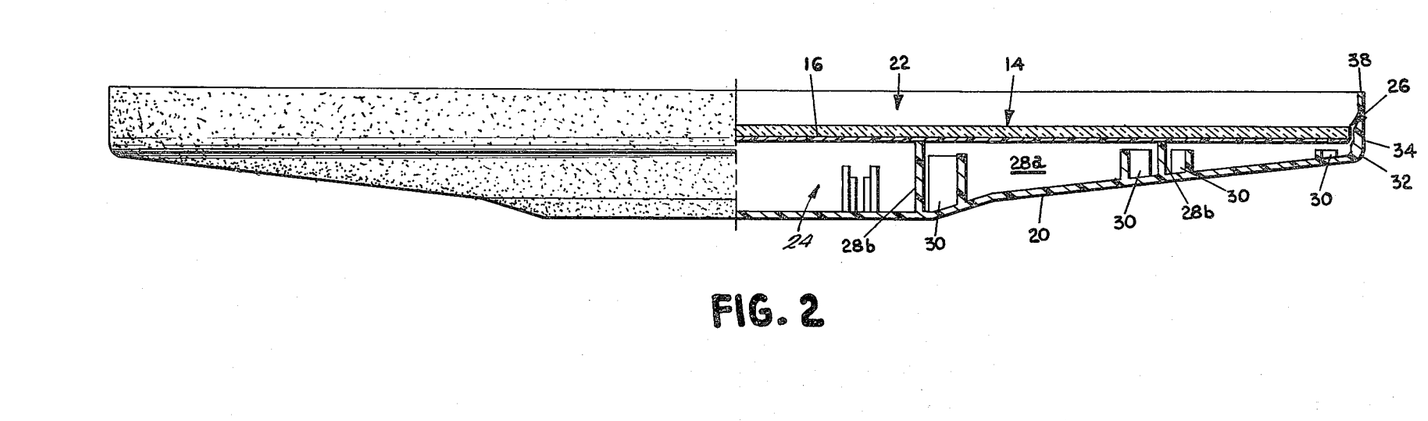
FIG. 2 is a plan view of the mirror element and case shown partially in cross section as taken along plane II—II of FIG. 1.

Referring now to the figures in greater detail, FIGS. 1 and 2 show the rearview mirror assembly 10 comprising a molded, resinous mirror case 12 receiving a mirror element 14. Preferably, mirror element 14 is a piece of transparent glass, plexiglass, plastic or other transparent, rigid material having a layer of reflective material 16 placed on its rear surface. As shown in several of the other figures, mirror element 14 may be a prismatic element wherein the front and back surfaces thereof are each generally planar but are not parallel with one another. The prismatic element allows adjustment of the mirror assembly for day and night use to reduce the overall intensity of the image reflected from the mirror.

Case 12 comprises a molded body of thermoplastic material including a back or rear portion 20 and peripheral side walls 22 extending generally perpendicularly with respect to the back wall 20 and being integral therewith. Side walls 22 are continuous and extend around the entirety of the case 12. They generally conform to the shape of the outline of the mirror element 14 which is received within the cavity 24 formed by the continuous side walls. The mirror element 14 is dimensioned such that it is slightly smaller than the outline of the peripheral side walls 22 thereby providing an integral space 26 into which the mirror element and case may respectively expand or contract in extremes of temperatures without causing the mirror to be expelled from the case or to be broken.

As is best seen in FIGS. 1 and 2, the case 12 also includes integral, upstanding support ribs 28 and integral, structural cross members 30 molded integrally with the interior of the back or rear 20 of the case. Support ribs 28 and cross members 30 lie in planes which are parallel to the planes including the side walls 22 of the case. Ribs 28 are spaced at intervals to support the mirror element under its entire length and width and include longitudinal ribs 28a which extend lengthwise of the case and ribs 28b which are perpendicular to ribs 28a and extend transverse to or across the width of the case as shown in FIG. 1. Cross members 30 are also perpendicular to one another but extend diagonally across the case in two directions and thereby lend support for the case and prevent its twisting by reason of torsion forces. While ribs 28a and 28b support the mirror element 14 a distance away from the interior surface of the back or rear 20 of case 12 as is illustrated, cross members 30 are lower or shorter than ribs 28 and do not supportingly engage the back of the mirror element. As shown in FIGS. 3, 4, 5, 8, and 9, the top surfaces of ribs 28 and cross members 30 are inclined across the width of case 12 to accommodate prismatic mirror elements. With a planar element, no incline is necessary. Primarily, the use of supporting ribs 28 to space the mirror element from the back of the case eliminates the need for a solid supporting surface which would otherwise add weight to the overall mirror assembly. However, in certain applications, it may be desirable to provide a case having a solid back for supporting the mirror, the case also including curved, arcuate edges formed in accordance with the present method. Although a relatively small amount of material is utilized in ribs 28 to support the mirror element, the problem of vibration of the mirror element within the case is solved by the inventive curled edge which maintains the element tightly in contact with the supporting ribs as will be more fully explained below.

As is best seen in FIGS. 1–5 and 8, the peripheral side walls 22 of case 12 include three primary sections 32, 34, and 36 in the preferred embodiment. The first or base section 32 is integral with the back 20 of the case 12 and flares slightly outwardly from the point at which it joins the back 20 as it extends upwardly away therefrom. Base section 32 has a thickness which approximates the thickness of the general thickness of the back 20.

Figure 4:
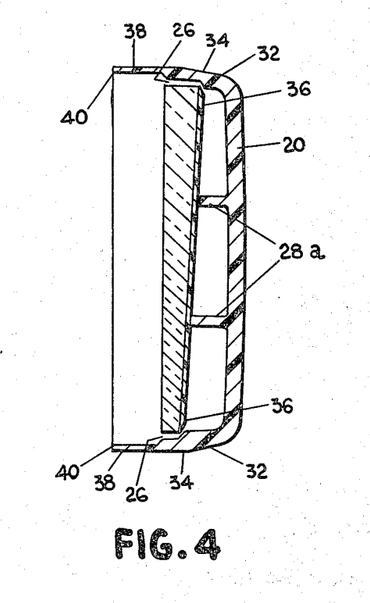
FIG. 4 is a cross-sectional, side elevation of the mirror case and mirror element taken along plane IV—IV of FIG. 1.
Figure 5:
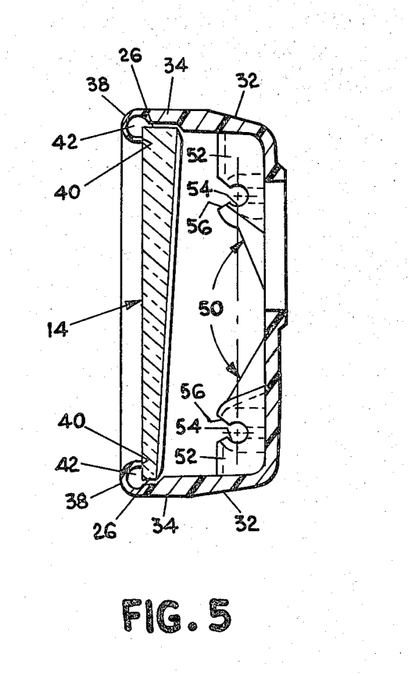
FIG. 5 is a cross-sectional side elevation of the completed rearview mirror assembly similar to the view shown in FIG. 3 but including the mirror element and showing the arcuate retaining edge formed over the mirror element.

Extending outwardly beyond base section 32 is the intermediate section 34 having a thickness generally one-half to two-thirds that of the base section 32. The reduced thickness of intermediate section 34 is formed by an inclined ledge 36 extending into the thickness of the side wall at the end of base section 32. In the preferred embodiment, when the mirror element 14 is received in the case, the back of the mirror only slightly or marginally contacts ledge 36 and therefore derives relatively little support therefrom. The primary mirror support is provided by support ribs 28 as described above. The reduced thickness of intermediate section 34, however, provides an integral space 26 about the entire periphery of the mirror as illustrated. Note that the height or width of intermediate section 34 is dependent upon the type of mirror element received, i.e., either generally planar or prismatic. With the prismatic mirrors, as shown in FIGS. 4 and 5, the height of section 34 will be tapered along the ends of the case to provide the appropriate width adjacent each transverse edge of the prismatic element. With a generally planar element, however, the height of section 34 will be uniform about the entire periphery of the mirror.

The final section 38 is a thin, upstanding extending flange which is formed integrally with the end of intermediate section 34 about the entire periphery of the case. Flange 38 has a thickness approximately one-half to one-third of that of intermediate section 34 thereby making it approximately one-fourth to one-third the thickness of base section 32. When formed in accordance with the inventive method described below, flange 38 is permanently curled in a semicircular fashion such that its free end or edge 40 contacts the exposed front surface of mirror element 14 generally normally thereto. The semicircular curvature of flange 38 provides an integral, dome-shaped space 42 which communicates with integral space 26 about the entire periphery of mirror 14 (FIG. 5). In the completed assembly, end 40 of flange 38 is substantially parallel to and in contact with the planar front surface of the mirror. Further, the semicircular curled flange 38 forces the mirror element about its entire periphery downwardly against support ribs 28 holding the element tightly thereagainst to prevent any undesired vibration. In extremes of temperatures, the integral spaces 42 and 26 provide areas into which the mirror 14 may expand beneath edge 40 of flange 38 and the case 12 may contract to prevent expulsion or fracture of the mirror.

Referring now to FIGS. 8–11, the structure for preventing vibration of the mirror element within the case will be better understood. As shown therein, the mirror element 14 rests on the tops 44 of both the supporting ribs 28a and 28b. In order to prevent the scattering of pieces of mirror 14 should it accidentally be broken, and in order to provide a resilient layer to help reduce vibration, the back surface of mirror 14 is coated with a coating or layer 46 of resilient, impressionable material such as polyvinyl chloride plastisol or another similar material. Layer 46 extends over the entirety of the back surface of either the planar or prismatic mirror 14.

In the preferred embodiment, layer 46 has a thickness of approximately 0.020 to 0.045 inches, which thickness tapers and becomes less adjacent the edges of mirror element 14 (see FIGS. 4 and 5). The reflective layer 16 is normally covered with a protective layer of primer paint over which the plastisol layer is applied. Although the primer paint, which is preferably a heat sensitive adhesive including a pigment for hiding the reflective layer on the mirror, namely, product number A 1103 B produced by B. F. Goodrich Chemical Co. of Cleveland, Ohio, has adhesive bonding qualities when heated, it has been found that an additional layer of a bonding agent or adhesive beneath the plastisol layer, which securely bonds the plastisol layer to the mirror element, is preferred. Such a suitable heat sensitive adhesive is product number J 1199 - Part B produced by Armstrong Cork Company of Cincinnati, Ohio. After application of these various layers, the mirror element and layers are cured by heating to a temperature of approximately 350° Fahrenheit (° F.). At this approximate temperature, the P.V.C. plastisol is chemically converted to polyvinyl chloride. Sufficient plasticizer is originally included in the plastisol to leave the cured layer 46 inherently resilient, flexible, and impressionable at all temperatures to which vehicles including such mirrors are normally subjected including even low, subzero temperatures. Although application of the P.V.C. layer is preferably done in plastisol form, the P.V.C. in nonplastisol form may be injection molded onto the back of the mirror. Other materials having the above characteristics of resiliency and flexibility over a wide temperature range, which may also be used for layer 46, include polyvinyl acetate, polyurethane, and silicone sealants.

In order to prevent lateral or transverse shifting of the mirror element (i.e., across the width of the case) during periods of vibration, extending, tapered fins 48 are molded at spaced intervals along the tops of support ribs 28a. Fins 48 extend longitudinally of the case and are impressed into the plastisol layer 46 by the force of the curled, semicircular flange 38 acting against the planar front surface of mirror 14 as explained above. In the final, assembled position, the rear surface of the plastisol layer 46 rests upon the coplanar tops 44 of support ribs 28a and 28b as represented by phantom line L in FIG. 8 and as shown in FIG. 9, while the actual reflective surface 16 of mirror element 14 is spaced from fins 48 as shown by phantom line M in FIG. 8 and as illustrated in FIG. 9. The longitudinal orientation of fin 48 presents a large surface area which resists the lateral shift of the mirror element transversely across the case because of the impression of the fin 48 in plastisol layer 46. Fin 48 also tends to prevent the longitudinal shift or vibration of the mirror element. However, the small surface areas of the ends thereof which face the longitudinal directions do not impede the expansion of the mirror element in the longitudinal direction. Such expansion occurs in the greatest amount in the longitudinal direction as explained below.

Figure 3:
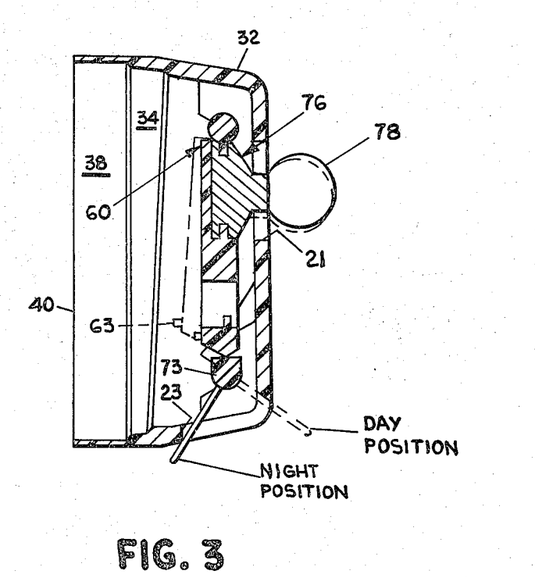
FIG. 3 is a cross-sectional, side elevation of the mirror case taken along plane III—III of FIG. 1 but excluding the mirror element and including an actuating means for shifting the mirror case and element with respect to an external support.
Figure 7:
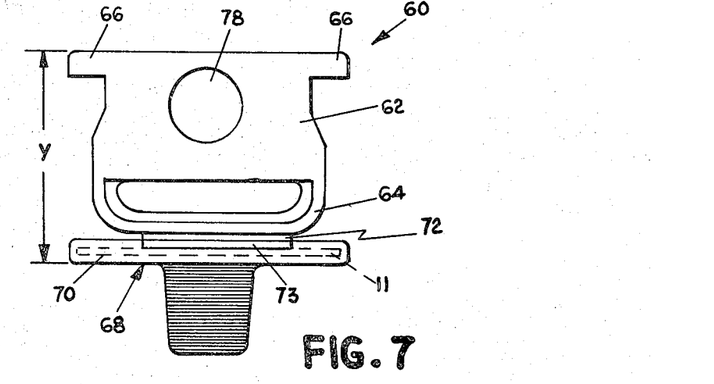
FIG. 7 is a back elevation of the actuator shown assembled in the mirror case in FIG. 3.
Figure 8:
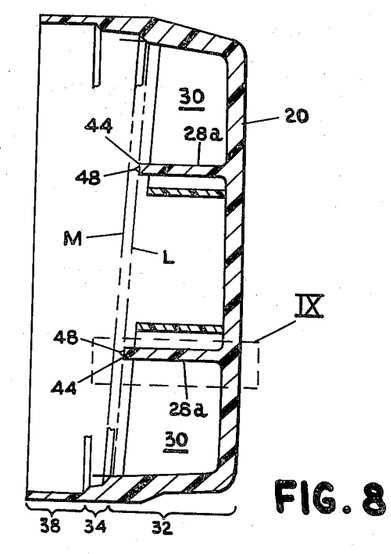
FIG. 8 is a cross-sectional, side elevation of the mirror case without the mirror element taken along plane VIII—VIII of FIG. 1.
Figure 9:
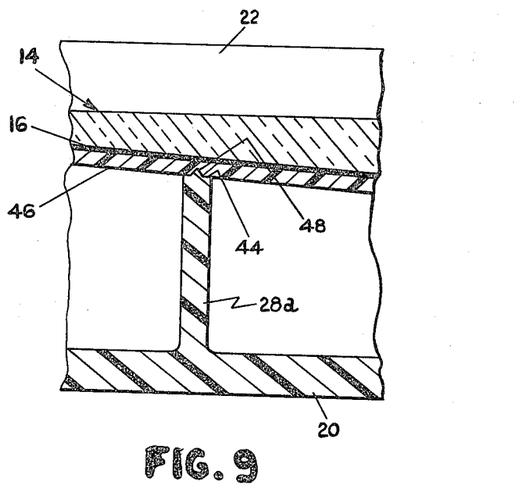
FIG. 9 is an enlarged, fragmentary, cross-sectional view of the upstanding support ribs spacing the mirror element from the back of the mirror case showing the area IX in FIG. 8.
Figure 10:
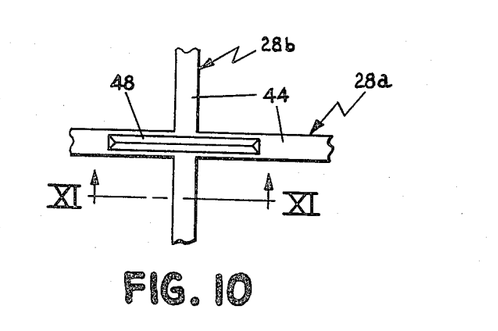
FIG. 10 is an enlarged, fragmentary, plan view of the intersection of two supporting ribs in area IX of FIG. 1 showing a tapered fin formed thereon and extending in the longitudinal direction of the case.
Figure 11:
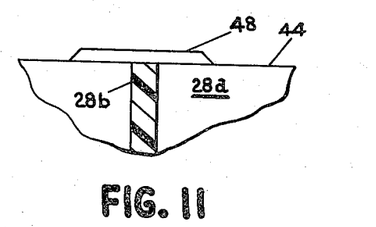
FIG. 11 is a fragmentary, cross-sectional, side elevation of the upstanding rib including the tapered fin thereon taken along plane XI—XI of FIG. 10.
Figure 12:
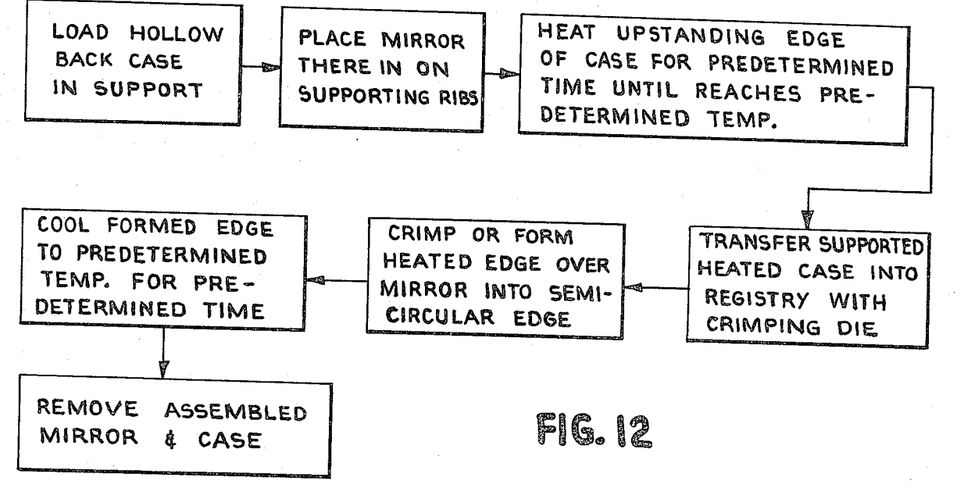
FIG. 12 is a schematic illustration of the present inventive method for heating and forming the extending edge of the mirror case shown in FIGS. 1–5 and 8.

Referring now to FIGS. 1–3, case 12 also includes integral, molded supports 50 for receiving a toggle-type actuator 60 shown in FIGS. 3, 7, and 8. Actuator supports 50 comprise upstanding walls or ribs 52 molded integrally with the back 20 of case 12 such that the walls extend generally transverse to the lengthwise dimension of the case and lie in planes substantially parallel to those including support ribs 28b. Each of the actuator supports 50 includes a partially enclosed, cylindrical aperture 54 formed in the sets of walls in each support, the apertures 54 in the lengthwise aligned pairs of supports 50 being coaxial as shown in FIG. 1. As shown in FIG. 5, each of the apertures is nearly completely enclosed except for a V-shaped slot 56 opening from the front of the case such that the actuator 60 may be easily snapped thereinto. Further, the longitudinal axes of the four cylindrical apertures 54 in the preferred embodiment all lie in the same plane which is substantially parallel to the front surface of the mirror element 14 in the assembled case.

Figure 6:
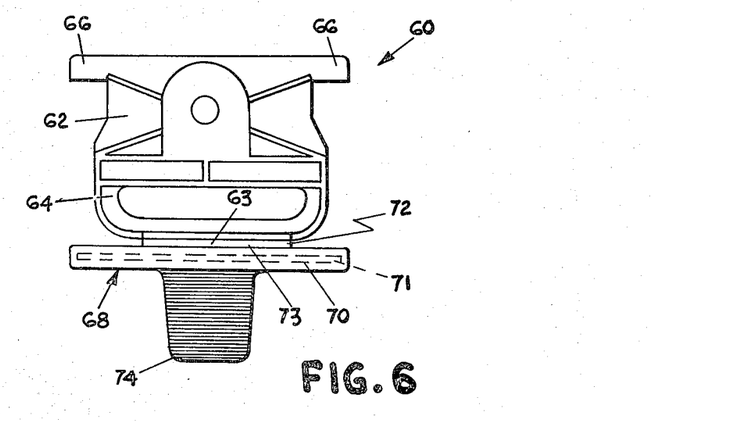
FIG. 6 is a front elevation of the actuator shown assembled in the mirror case in FIG. 3.

As shown in FIGS. 3, 6, and 7, the toggle actuator 60 comprises a molded body 62 including an integral, molded, generally U-shaped spring bar 64 and coaxial axles 66 extending from either lateral edge of body 62 at the upper end thereof. Integrally molded and joined with the bottom of spring bar 64 is the lower pivotal section comprising an axle 70 joined by an integral hinge 72 to the spring bar 64. Axle 70 includes an internal reinforcing rod 71 molded therewithin. An integral flip tab 74 extends downwardly from axle 70 to control the toggle action of the actuator while a steel or aluminum support 76 including a ball member 78 is molded integrally into the body 62 to form a connector for joining the mirror assembly to an external support.

As shown in FIG. 3, axles 66 and 70 of actuator 60 are snapped in place in cylindrical apertures 54 of actuator supports 50 such that ball member 78 extends through a circular aperture 21 in the back 20 of case 12 for connection to an external support. Flip tab 74 extends through an aperture 23 which is cut into the back 20 and lower base section 32 of peripheral side walls 22. As illustrated in FIGS. 1 and 7, the distance X between the external side walls of apertures 54 on the opposing actuator supports 50 is slightly less than the distance Y between the outer surfaces of axles 66 and 70 on actuator 60. Thus, when actuator 60 is snapped into place in apertures 54, shown in FIG. 3, the actuator 60 is placed in compression with the spring bar 64 and axle 66 each bowing or bending slightly to conform to the distance X. The compression on the actuator 60 caused by the reduced distance X, forces the actuator to snap into either its day position (phantom line) or night position (solid lines) as shown in FIG. 3. Thus, the actuator may be flipped via tab 74 from the day position, wherein the front surface is generally parallel to the rear surface of prismatic element 14 and to reflective layer 16 and where the flange 63 rests against the rear of the mirror, to the night position, wherein the lower edge of body 62 rests against the back 20 of case 12 and where the front surface of body 12 is substantially parallel to the front, planar surface of mirror element 14. Planar shoulders 73, which are molded upon axles 70, rest against the inclined lower surfaces of spring bar 64, as shown in FIG. 3, to further hold the actuator in either the day or night position. Thus, the mirror may be adjusted on ball member 78 such that a full intensity image is reflected from the reflective layer 16 on the rear surface of prismatic element 14. Thereafter, the case and mirror may be rotated upwardly with respect to the actuator 60, ball member 78, and an external support by flipping tab 74 to the night position. In the night position, the majority of light is reflected upwardly against the roof of the vehicle by the reflective layer 16 while a reduced intensity image of about 3 to 5 per cent of the incident light is reflected by the uncoated, planar front surface of the transparent mirror element.

As will now be understood from FIGS. 1–11, the present inventive mirror assembly provides an integral space into which the glass and mirror case can expand and contract respectively in extreme temperatures encountered in varying climatic regions while tightly retaining the mirror element within the case for the elimination of vibration. Both of these results are accomplished with a minimum of weight since the case itself comprises but a thin shell which is rigidified by the support ribs 28 and cross members 30. The reduced weight, of course, allows a much less bulky external support to be utilized with the case for mounting the mirror on a vehicle.

It has been found that polypropylene provides the best characteristics of lightness, strength, resiliency and thermoplasticity for the molding of the inventive cases 12 of the present invention. Generally, the cases are injection molded with the various structures as defined above. A pebble grain or other design may be included in the mold to provide the molded case with a roughened, decorative surface texture. The thin edge is then formed into the semicircular shape with the inventive method to be more fully described below thereby providing the integral spaces 26 and 42. In the preferred embodiment, space 26 is approximately 0.045 inches at ends of the mirror where the expansion of the glass in extreme temperatures is the largest. Generally, the space 26 will be uniform about the entire mirror element 14 but the spacing is not as critical along the transverse periphery or edges of the glass since the expansion of the glass in the transverse direction is not nearly as great as the lengthwise expansion.

The typical radius of the formed, semicircular thin flange 38 is 0.090 inches such that, in the preferred embodiment, the curled edge 38 extends over the periphery of the glass or other mirror element a distance approximately twice as great as the width of the integral space 26. This permits glass or other mirror elements having chipped or uneven edges, which would otherwise be unacceptable in other types of mirror cases, to be utilized in the present inventive case since the curled edge covers these imperfections. Thus, the rejection rate of rearview mirror assemblies using the present inventive case and method is greatly reduced thereby increasing substantially the efficiency of using this assembly.

In prior known mirror assemblies, the intent was generally to fit the dimensions of the mirror element as closely as possible to the dimensions of the mirror case. Thus, with premolded, snap-in type prior known mirror cases, the peripheral edge of the glass or other mirror element was supposed to fit tightly against the case periphery. Any irregularity or deviation in the mirror element size would accordingly obstruct the proper fit of the case therearound. Also, anything other than extremely minor chips or blemishes in the mirror element periphery would be visible in the assembled case. However, with the present case, the intent is to provide expansion room for the mirror and case, thereby eliminating the need to exactly fit mirror elements to the cases. Further, most chips and blemishes which may occur in the production of glass mirror elements are hidden by the molded flange 38 which, as mentioned above, extends over the mirror periphery a distance sufficient to hide such imperfections. The result is an increased production efficiency, reduced rejection rate for completed mirror assemblies, and a mirror assembly which is pleasing in appearance even though the mirror element edge is somewhat imperfect.

The following is an example of the typical amount of lengthwise expansion or contraction space required at the ends of the mirror case assembly of the present invention.

| | Example |
|---|---|
| Mirror dimension | = 12 inches in length |
| Temperature extremes | = −40° to 190° Fahrenheit (F) |
| | = −40° to 105° Centigrade (C) |
| Total temperature range | = 230° F. |
| | = 145° C. |
| Normal temperature | = Midpoint of temperature range |
| | = 75° F. |
| | = 41.6° C. |
| Coefficient of expansion of polypropylene | = a range of |
| $5.8 \times 10^{-5}$ | $\frac{\text{change in length per inch}}{°C.}$ |
| to $10.2 \times 10^{-5}$ | $\frac{\text{change in length per inch}}{°C.}$ |
| | Coefficient chosen at: |
| $8.0 \times 10^{-5}$ | $\frac{\text{change in length per inch}}{°C.}$ |
| Coefficient of expansion of plate glass | = |
| $4.9 \times 10^{-6}$ | $\frac{\text{change in length per inch}}{°C.}$ |
| Total change in length of case | = (12 inches) (145°C.) (8.0 × 10⁻⁵) |
| | = .1392 inches |
| Total change in length of glass mirror element | = (12 inches) (145°C.) (4.9 × 10⁻⁶) |
| | = .0085 inches |
| Difference in change in length between glass and case | = (.1392) − (.0085) |
| | = .1307 inches |
| Difference in change from normal temperature or midpoint of range | = (1/2) (.1307) |
| | = .06535 inches |
| Amount of expansion or contraction space required at either end of mirror case assembly | = (1/2) (.06535) |
| | = .03267 inches |

Thus, the preferred 0.045 inch space 26 at either end of the preferred embodiment provides a space which is more than sufficient to accommodate any expansion or contraction in the 12 inch mirror assembly without expelling or fracturing the mirror element.

DESCRIPTION OF THE PREFERRED METHOD

Referring now to FIGS. 12–15, the inventive method for forming the semicircular, curved edge 38 of the mirror case over the mirror element 14 to complete the above described mirror assembly is illustrated. The method is preferably performed with an edge forming apparatus 80 shown in FIGS. 13–15. A preferred and molded polypropylene case 12 of the type described above, with a mirror element 14 including a P.V.C. plastisol layer on its rear surface placed therein on support ribs 28, is loaded in a mating support block 82. Support block 82 is supported on a plate 84 which is slidably mounted over a base 86. Plate 84 is reciprocated between a loading and heating station A (shown in phantom) and a forming or crimping station B (shown in solid lines) by a hydraulic or compressed air cylinder and piston 90. The cylinder and piston are connected to the plate 84 via a connecting member 88. The movement of plate 84 toward station A is limited by adjustable stop 85. A press head 92, including a hot air gun 94 or other heating apparatus for heating air supported thereon is reciprocated vertically over the two stations A and B by a larger hydraulic or compressed air cylinder and piston 96 via connecting block 98. The cylinder 96 is supported from base 86 by a suitable post or other support means 100. The press head itself is guided for vertical sliding by posts 102 and cylindrical guides 104 attached to the bottom of head 92.

Figure 13:
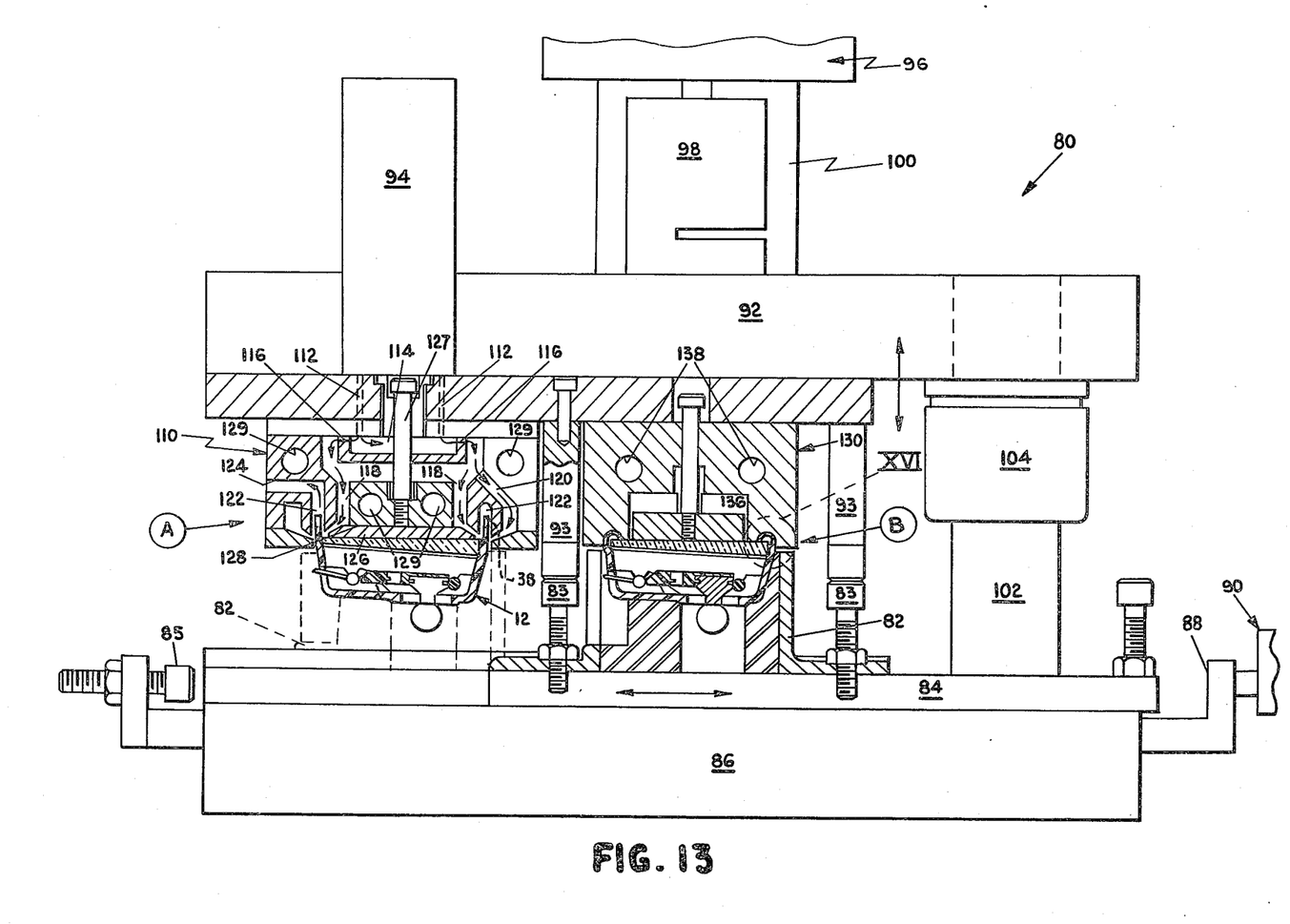
FIG. 13 is a cross-sectional view of one embodiment of the heating and forming apparatus utilized in the method described in FIG. 12.
Figure 14:
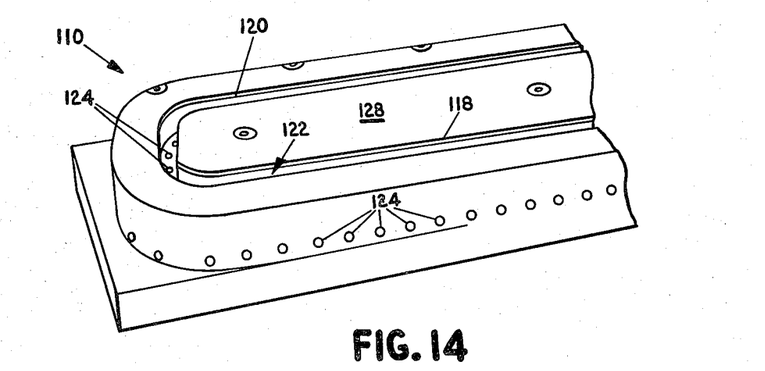
FIG. 14 is a fragmentary, perspective view of the heating die utilized to heat the extending edge of the mirror case.
Figure 15:
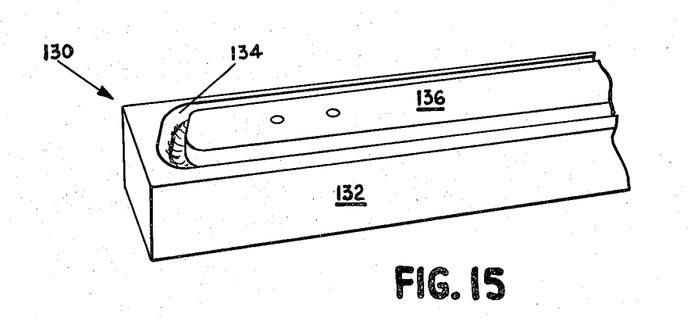
FIG. 15 is a fragmentary, perspective view of the forming die used to form the extending edge of the mirror case following its heating with the heating die shown in FIG. 14.

Supported beneath the press head 92 in vertical alignment with the positions of support block 82 at stations A and B are a heating die 110 and a forming die 130. Press head 92 includes hot air ducts 112 which communicate with a hot air manifold 114 in die 110. Passageways 116 in the sides of manifold 114 allow the hot air to escape therefrom and travel through hot air passages 118 and 120 which extend along the interior and exterior sides of the upstanding, extending thin edge 38 of case 12 about the entire periphery of the case (FIGS. 13 and 14). The thin edge 38 extends upwardly into a cavity 122 which extends around the entire periphery of the case (FIG. 14). The sides of cavity 122 extend immediately adjacent but never contact the thin flange 38. Hot air from gun 94 passes through passageways 118 and 120 into the bottommost open end of cavity 122 and rises along the sides of flange 38. The point at which the hot air first contacts flange 38 is controlled by the height of support block 82 such that the heated fluid uniformly begins heating the flange 38 approximately at or slightly above the junction between flange 38 and intermediate section 34 (see FIGS. 5 and 8). Further, adjustment is made by controlling the height to which the head 92 is lowered over the edges 38 by means of stops 93 extending downwardly from the bottom at 92 into contact with adjustable stops 83 secured to plate 84. After the hot air has risen along and uniformly heated flange 38, it exits through exhaust ducts 124 to the sides of heating die 110 (FIGS. 13 and 14). Uniform pressure is maintained against mirror element 14 by a spring-biased block 126 having an asbestos mirror element contact sheet 128 secured along its lower face. Asbestos sheet 128 is forced into contact with the glass thereby securely retaining it against support ribs 28 via a spring within a tube shown at 127. The heating die further includes heating passageways 129 both in the main body of die 110 and in block 126. Passageways 129 may be used either to receive heating coils or to transmit a heated fluid through the die to further facilitate the heating of the thin flanges 38.

In the preferred embodiment, the amount or length of extending edge 38 to be heated is approximately 0.287 inches which corresponds to the circumference of the semicircular curled edge having a radius of 0.09 inches as was mentioned above. The thickness of the heated edge 38 is approximately 0.040 inches. The hot air is directed against the edge until the thermoplastic edge reaches a temperature just below its temperature of plasticity. Thus, in this condition, the edge will be sufficiently formable to be curled into the semicircular form but will retain sufficient strength and resiliency to prevent complete collapse into an unformed mass during the semicircular curling with the forming die 130. It has been found that by heating the edge having such a thickness for between 50 and 70 seconds to a temperature of between 150° C. and 170° C. produces the correct formable condition in the thin edge.

Figure 16:
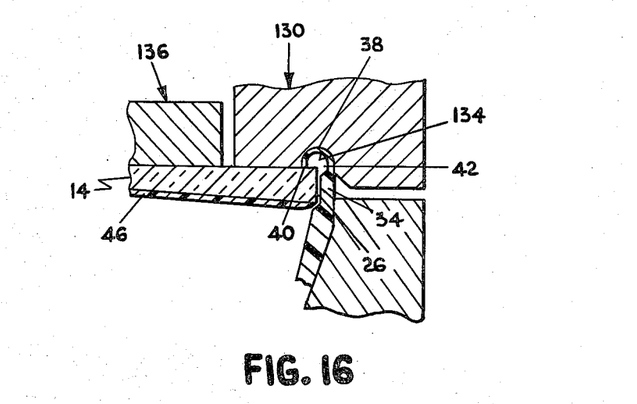
FIG. 16 is an enlarged, fragmentary view of area XVI of FIG. 13.

Following the heating of the extending edge 38 on case 12, the press head 92 is reciprocated vertically upwardly by cylinder and piston 96. Thereafter, the plate 84 including the support 82 and mirror assembly 10 is slidably reciprocated to the right, as shown in FIG. 13, via cylinder and piston 90 such that it is in vertical registry with the forming ddie 130 at station B. Forming die 130 comprises an aluminum block 132 (FIG. 15) having a semicircular groove 134 extending in the outline of the entire periphery of the upstanding thin edge 38 on case 12. As shown in FIG. 16, groove 134 has a semicircular configuration in cross section such that the heated, thin, extending edge 38 follows the curvature therearound until its free end or edge 40 engages the front surface of mirror element 14 substantially normally or perpendicularly. This provides the dome-shaped internal space 42 which communicates with the peripheral space 26 adjacent the edge of the mirror element and intermediate section 34. A central block of aluminum 136 (FIGS. 13, 15, and 16) is biased against the mirror element 14 in the center of forming die 130 to tightly retain mirror element 14 against the supporting rib 28 during the forming operation. Further, the forming die including groove 134 may be coated with a coating of Teflon (polytetrafluoroethylene) to facilitate the sliding of the heated flange 38 around the semicircular groove during formation or may be left with a smooth polished metallic surface.

Following the formation of the curved flange by lowering the forming die 130 thereover, the aluminum, Teflon coated die is left in contact with the formed edge 38 until the edge has sufficiently cooled to keep the end or edge 40 in tight contact with the front surface of mirror element 14. In order to facilitate the cooling process, cooling passageways 138, which conduct cooling fluids or receive cooling coils, are included in the forming die 130 to help maintain the die at a temperature below that of the heated flanges 38. Leaving the forming die in contact with the formed edge until cooled overcomes any surface tension which might tend to draw the formed edge away from the glass due to uneven cooling should the forming die be removed too soon. Thus, after a sufficient cooling time, the forming die is withdrawn and the curled edge remains tightly in contact with the front surface of the mirror element around the entire periphery of the case thereby retaining the mirror securely against the supporting ribs 28 and preventing any vibration in the completed assembly 10.

As will now be understood, the method basically comprises loading a preformed case including any actuating mechanism and a mirror element therein, heating via a heated fluid the upstanding free thin edge of the case about the entire periphery thereof for a predetermined time until a predetermined temperature is reached, and thereafter transferring the case including the heated edge into registry with a forming die having a semicircular groove extending about the entire outline of the case periphery. The semicircular groove which has a temperature less than that of the heated edge is brought into contact with the edge thereby forming the edge into the curled form including the integral space which allows the expansion of the mirror element and contraction of the mirror case. The forming die is left in contact a sufficient time to assure the formed edge will remain in contact with the front surface of the mirror element, after which the forming die may be withdrawn and the assembled case removed.

It is apparent that the edge is heated to a sufficient temperature for forming without ever coming in contact with the heating die. Rather, the heating medium comprises a fluid, in this case heated air, which contacts the edge only at the area which later will be formed. Thereafter, the heated edge at the forming temperature is brought into contact with the forming die. The forming die is at a temperature less than that of the heated edge which thereby forms and immediately cools the edge to maintain it in contact with the mirror element.

Accordingly, the present inventive method produces a mirror assembly which is extremely light in weight and therefore easy to support, but which is strong, safe, and prevents the mirror element from being expelled therefrom in extreme temperatures. Further, the assembly includes means which prevent the mirror element from rattling or vibrating therein under periods of vibration in a vehicle as well as means which prevent the scattering of broken pieces of the mirror element should it be broken in an accident. All of these advantages are accomplished efficiently with the above disclosed method which results in an extremely low rejection rate for completed mirror assemblies since any defect or irregularities in the edges of the mirror elements are hidden or covered by the formed semicircular edge without affecting the performance of the completed product.

While one form of the invention has been shown and described, other forms will be apparent to those skilled in the art. Therefore, it will be understood that the embodiment shown in the drawings and described above is merely for illustrative purposes, and is not intended to limit the scope of the invention as defined by the claims which follow.

The embodiments of the invention in which an exclusive property or privilege is claimed are defined as follows:

1. A rearview mirror assembly comprising a case and a mirror element having front and back surfaces and a peripheral edge fitted therein; said case being molded in one piece from a thermoplastic material and having a back and a continuous peripheral side outlining said peripheral edge of said mirror element and being spaced outwardly therefrom; said case including support means for supporting said mirror element; said peripheral sides of said case including arcuate wall means curving over at least a portion of said peripheral edge and contacting said front surface of said mirror element for holding said mirror element against said support means, retaining said mirror element in said case, and preventing forward and rearward movement of said mirror element out of its general plane within said case; said assembly including a space between the entire thickness of said peripheral edge of said mirror element and said outwardly spaced peripheral sides of said case; said arcuate wall means including means for allowing differential expansion between said mirror element and said case generally in the plane of said element into said space while said arcuate wall means remain in contact with said front of said element; said space adapted to be substantially filled by said peripheral edge of said mirror in different temperatures and providing an expansion and contraction area for said assembly to prevent breakage of said element when said assembly is exposed to extreme temperature conditions.

2. The assembly of claim 1 wherein said mirror element has a width and a length; said support means for supporting said mirror element including shift preventing means for preventing a lateral shift in position of said mirror element in said case.

3. The assembly of claim 2 wherein said support means comprise at least one upstanding rib extending between the interior of said back of said case and said mirror element; said shift preventing means comprising said rib and a thickness of impressionable material adhered to the back of said mirror element; said rib extending into said impressionable material to prevent said mirror element from laterally shifting in said case; said impressionable material also being glass retaining to prevent the scattering of pieces of said mirror element should it be accidentally broken.

4. The assembly of claim 3 wherein said upstanding rib includes a fin tapered toward said mirror element; said fin being sufficiently resilient to bias said mirror element against said arcuate means for securing said element against said rib to prevent vibration of said element in said case.

5. The assembly of claim 1 wherein said support means for supporting said mirror element comprise at least one upstanding rib extending between the interior of the back of said case and the back of said mirror element.

6. The assembly of claim 5 including a ledge extending partially into the thickness of said peripheral sides of said case for at least partially supporting the periphery of said mirror.

7. The assembly of claim 1 wherein support means for said mirror element include a ledge extending into the thickness of said peripheral side from the interior surface thereof for at least partially supporting said mirror.

8. The assembly of claim 1 wherein said arcuate wall means for securing said mirror element against said supporting means include a thin, semicircular flange integral with said peripheral side of said case, said means for allowing differential expansion including an end surface on said flange; said flange being thinner than the remainder of said peripheral side and extending over said peripheral edge of said mirror element along the entire periphery thereof to retain said element in said case; said flange including an internal space communicating with said space between said peripheral edge of said mirror element and said peripheral side of said case; said mirror element including a generally planar front surface; said end surface contacting said front surface generally normally thereto whereby said mirror element can expand in a direction parallel to the plane of said front surface beneath said end surface.

9. The assembly of claim 1 wherein said arcuate wall means extend over the entirety of said peripheral edge of said mirror element and contact said front surface of said element a distance spaced inwardly from said peripheral edge sufficient to hide most chips or other production irregularities present in said peripheral edge.

10. A rearview mirror assembly comprising a case and a mirror element supported in said case and having a peripheral edge; said case having support means for supporting said mirror element in said case and a continuous peripheral case including outlining said peripheral edge; said case including a thin flange integral with said peripheral side and extending along the entire length thereof; said flange being thinner than the remainder of said peripheral side and extending over said peripheral edge and into contact with the front of said mirror element about the entire periphery of said mirror element whereby said mirror is retained against said spacing means; said flange providing a space interior thereof between said peripheral side and the entirety of said peripheral edge of said mirror element and including means for allowing differential expansion between said mirror element and said case generally in the plane of said element into said space while said flange remains in contact with said front of said element whereby said mirror element can expand and said case can contract in extreme temperatures without breaking said mirror or causing said mirror to separate from said case.

11. The mirror of claim 10 wherein said flange is arcuate and includes a dome-shaped space therewithin.

12. The mirror of claim 11 wherein said arcuate flange is semicircular in cross-section.

13. The assembly of claim 10 wherein said flange includes two parallel sides, said means for allowing differential expansion including an end surface of said flange which is substantially perpendicular to said parallel sides; said mirror element including a generally planar front surface; said end surface contacting said front surface generally normally thereto whereby said mirror element is prevented from vibrating in said case but allowed to expand and contract beneath said end surface.

14. The assembly of claim 10 wherein said spacing means comprise a ledge extending into the thickness of said peripheral side such that said ledge has a predetermined width for supporting the peripheral edge of said mirror; said flange extending over said peripheral edge of said mirror a distance greater than the width of said ledge to prevent said element from being expelled from said case and to hide any irregularities in the peripheral edge of said mirror element.

15. The assembly of claim 10 wherein said case includes a prismatic mirror element having non-parallel front and back reflecting surfaces and means for shifting said case and prismatic mirror with respect to an external support for said assembly; said shifting means allowing the selection of day and night positions of said case and prismatic mirror element.

16. The assembly of claim 10 wherein said case includes a back and at least one integral upstanding rib comprising said support means; said rib extending between the back of said mirror element and the back of said case; said flange retaining said mirror element against said rib to prevent vibration of said element in said case.

17. The assembly of claim 16 wherein an impressionable layer of material is adhered to the back of said mirror element; said rib extending into said layer to prevent vibration of said mirror within said case and to prevent pieces of said mirror from scattering should said mirror be accidentally broken.

18. A case molded in one-piece from one thermoplastic material and adapted to receive a mirror element having a generally planar front surface; said case including support means for supporting such a mirror element and a continuous upstanding peripheral side extending therearound and adapted to outline the periphery of a mirror element when fitted within said case; said upstanding peripheral side including a portion adjacent to and extending along and above the entirety of the peripheral edge of such a mirror element when said mirror element is received therein, said portion being thinner than the remainder of said side to provide a space between said portion and the thickness of the peripheral edge of such a mirror element; said thinner portion having a uniform height at all points around said periphery of said case sufficient to allow said portion to be curled in semicircular configuration over the edge of a mirror element when received in said case such that the end of said thinner portion is adapted to contact said planar front surface of said mirror normally thereto.

19. The case of claim 18 wherein an intermediate portion of said peripheral side adjacent the entirety of the thickness of a mirror element adapted to be received within said case has a thickness greater than said thinner portion but less than the thickness of the remainder of said side; said thinner portion extending from and beyond said intermediate portion.

20. The case of claim 18 wherein said case includes a back and said support means comprise at least one upstanding rib extending from said back adapted to support such a mirror element.

21. The case of claim 20 wherein a portion of said upstanding rib is tapered.

* * * * *

UNITED STATES PATENT AND TRADEMARK OFFICE
CERTIFICATE OF CORRECTION

PATENT NO. : 3,918,799
DATED : November 11, 1975
INVENTOR(S) : Arthur W. Kurz, Jr. and Harold R. Wilson It is certified that error appears in the above-identified patent and that said Letters Patent are hereby corrected as shown below:

Column 1, line 25;

"formed cases are fromed" should be --metallic cases are formed--;

Column 2, line 47;

"platisol" should be --plastisol--;

Column 14, line 22, Claim 10;

"case including" should be --side--;

Column 14, line 23, Claim 10;

"caseincluding" should be --case including--.

Signed and Sealed this thirteenth Day of April 1976

[SEAL]

Attest:

RUTH C. MASON
Attesting Officer

C. MARSHALL DANN
Commissioner of Patents and Trademarks